April 11, 1939.  N. C. CUDDEBACK ET AL  2,154,035
TRACTION TIRE
Filed Oct. 2, 1936   4 Sheets-Sheet 1

Inventors
Nelson C. Cuddeback
Bert R. Benjamin

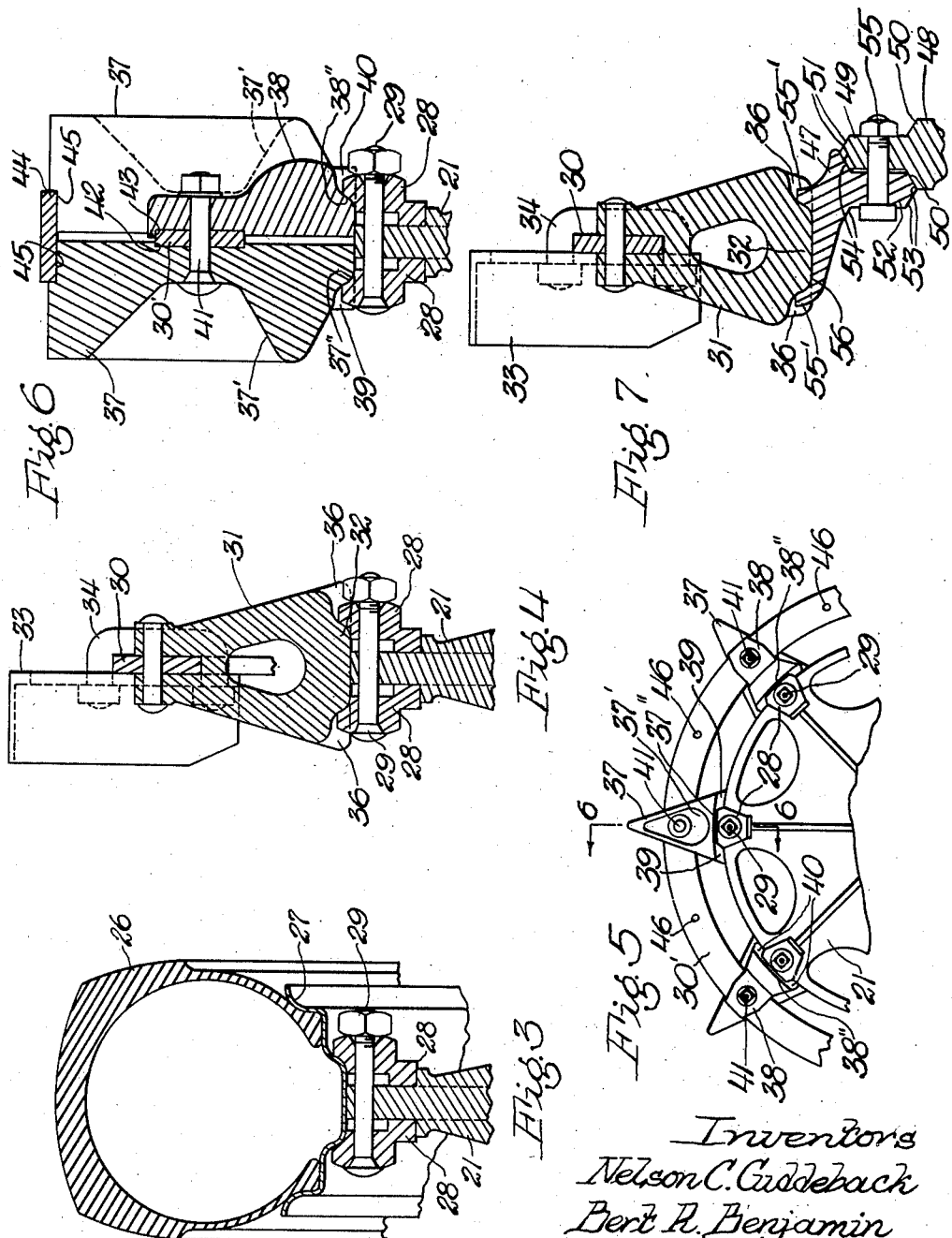

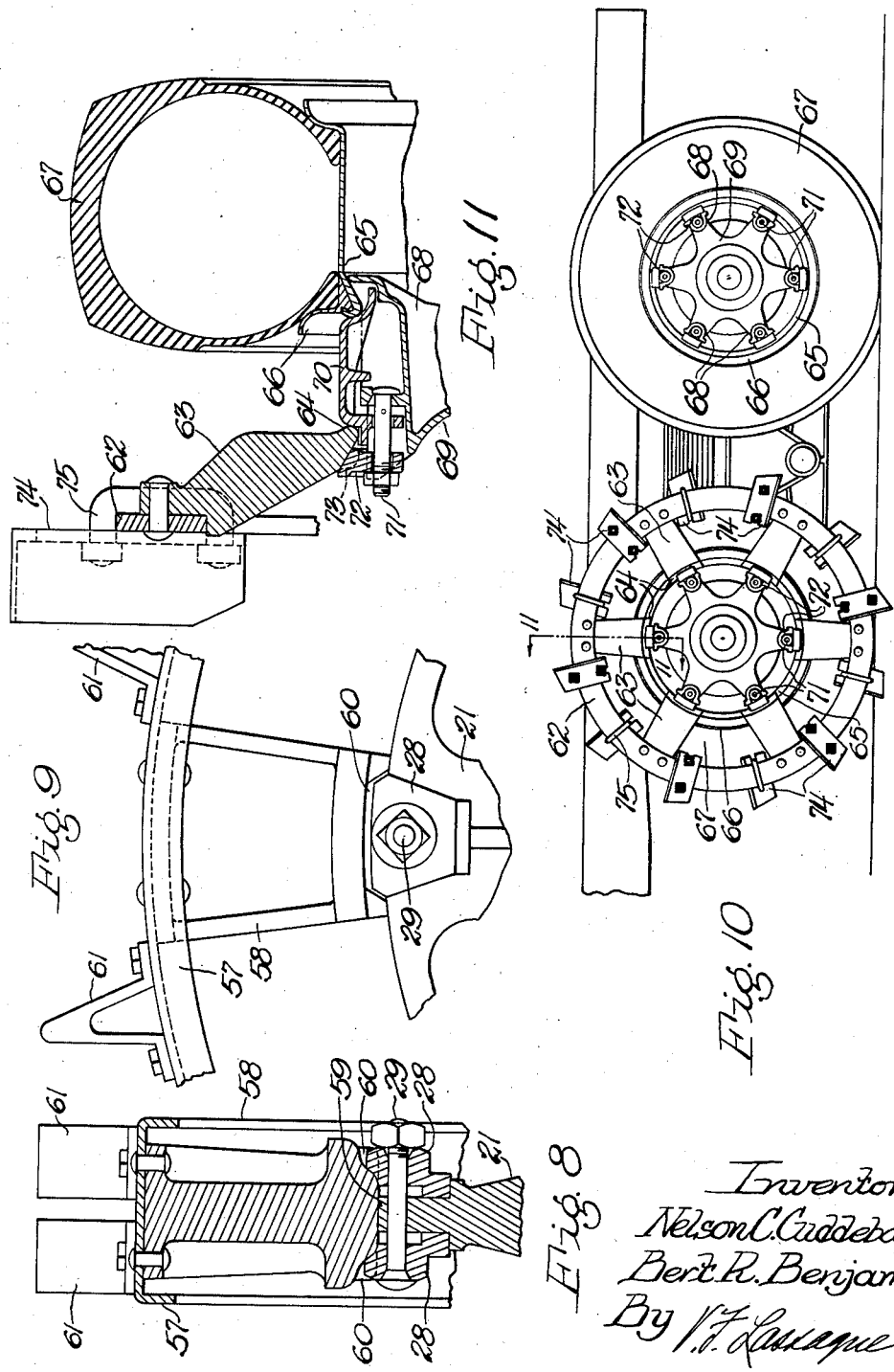

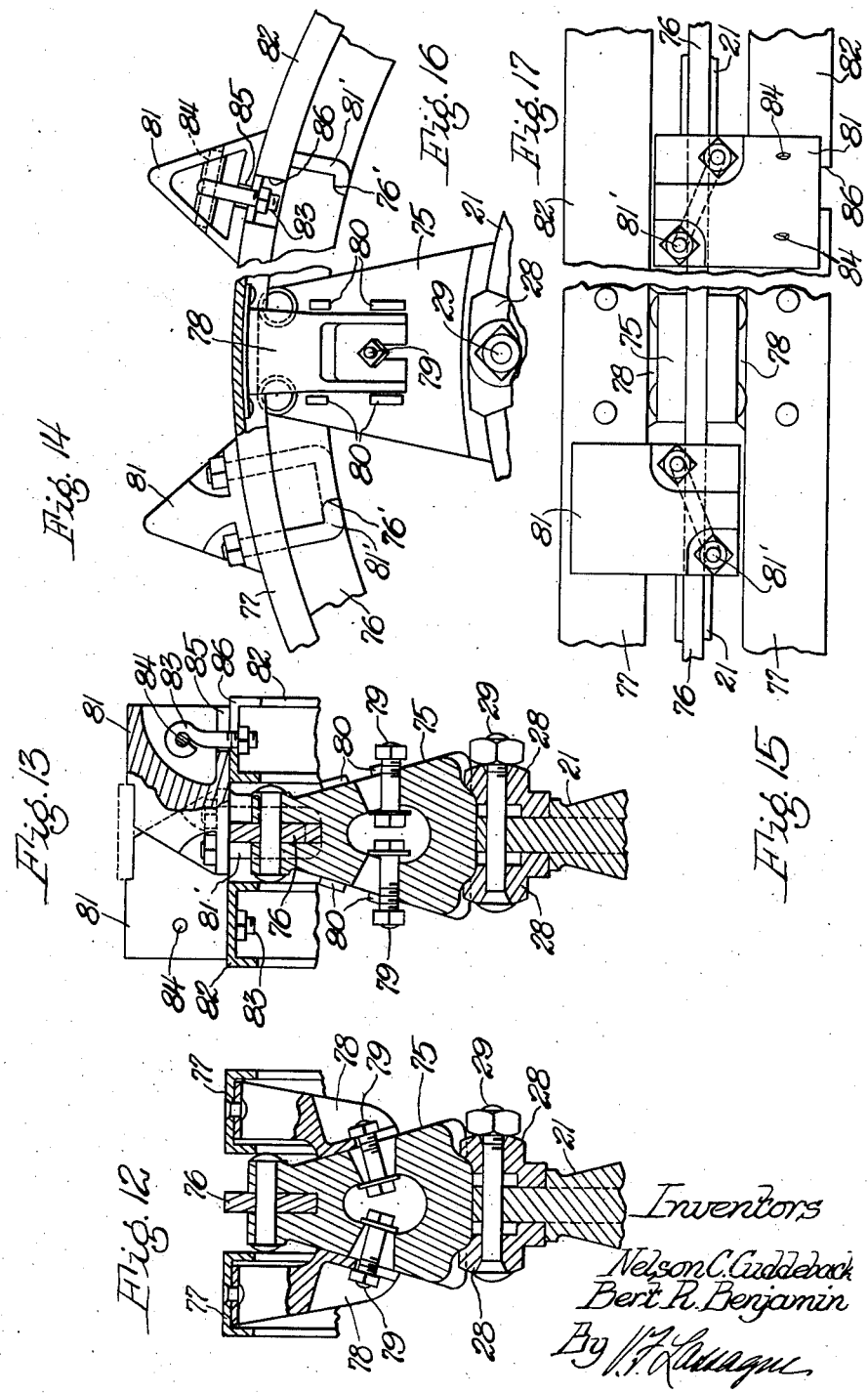

Patented Apr. 11, 1939

2,154,035

UNITED STATES PATENT OFFICE 2,154,035

TRACTION TIRE

Nelson C. Cuddeback, Chicago, and Bert R. Benjamin, Oak Park, Ill., assignors to International Harvester Company, a corporation of New Jersey Application October 2, 1936, Serial No. 103,738

4 Claims. (Cl. 301—40)

This invention relates to wheels for self-propelled vehicles with more particular reference to wheels in connection with what is known as traction tires or rims provided with traction tires that may be quickly and readily substituted for the ordinary pneumatic or other cushion tires used in connection with road, tractor, or pleasure vehicles or for the rims for which said tires are mounted on wheels of the demountable rim type.

It is well known that air tires for use with tractors of the general purpose type are coming more and more into general usage. Nevertheless at times it is necessary to provide increased traction, especially in muddy conditions or in icy conditions, which the usual tractor air tire is not able to furnish.

It is the primary object of this invention to provide simple and efficient means for the interchangeability from the regular air tire for a tractor to the usual traction lug type of steel tire or vice versa.

Another object of the invention is to provide vehicles, especially motor trucks, with additional traction means in the form of lug wheels wherein increased traction may be had in snow or mud.

Another object is to provide means for mounting a steel traction wheel so as to interchange with an ordinary dual air tire construction.

Another object is to provide means whereby the steel traction tires may be interchanged with the usual tractor air tires and held in place by the ordinary quick detachable clamp.

Another object is to provide a special mounting whereby various types of lugs may be attached to the steel traction tire.

Another object of the invention is to provide steel rims of various shapes which are interchangeable with the usual tractor air tire.

Another object is to provide means for mounting extension rims on this new type of demountable steel tire.

Another object is to provide means for mounting of extension rims to the traction lugs.

Another object is to provide supporting means for the steel traction tire with an attachable portion conforming to the usual well of the rim of the traction tires.

Another object is to provide a safety wheel in case of punctures.

The foregoing and other objects which will be evident to those skilled in the art are attained by the structure hereinafter described and claimed and illustrated in the accompanying drawings wherein:

Figure 3 is a cross section along line 3—3 of Figure 1 showing the shape of the well of the demountable rim and an air tire;

Figure 4 is a section through 4—4 of Figure 2 showing the means for mounting the detachable steel rim in place of the detachable air tire and rim;

Figure 5 shows a modification of the steel tire in Figure 2 using cast lugs in place of angle iron lugs;

Figure 6 is a section on line 6—6 of Figure 5 looking in the direction of the arrows showing the shape of the cast lug and its attaching portion for attaching to the spider of the tractor;

Figure 7 shows a steel traction wheel similar to that in Figure 2, but provided with an attaching lug wherein the steel rim may be mounted in any one of four positions;

Figure 8 is a modification of a steel traction rim having the usual flat tire;

Figure 9 is a side view of the traction tire shown in Figure 8;

Figure 10 shows a steel traction tire attached to one of the drive wheels of a four-wheel drive truck with the steel traction tire replacing an air tire;

Figure 11 is a section along line 11—11 of Figure 10 showing a dual wheel with air tires with one of the air tires replaced by the steel traction tire;

Figure 12 is a modification of the self-cleaning steel wheel, as shown in Figure 4, showing means for attaching extension rims;

Figure 13 is a modification of the steel traction rim, as shown in Figures 4 and 12 provided with lugs having means for attaching extension rims;

Figure 14 is a side view of Figure 12 showing the extension tires and traction lugs;

Figure 15 is a top view of the steel traction tire shown in Figures 12 and 14 with the extension tires and traction lugs in place;

Figure 16 is a side view of a portion of Figure 13 showing the mounting of an extension rim to a traction lug; and, Figure 17 is a top view of the steel traction tire shown in Figures 13 and 16 with the extension tires and traction lugs in place.

Figure 2:
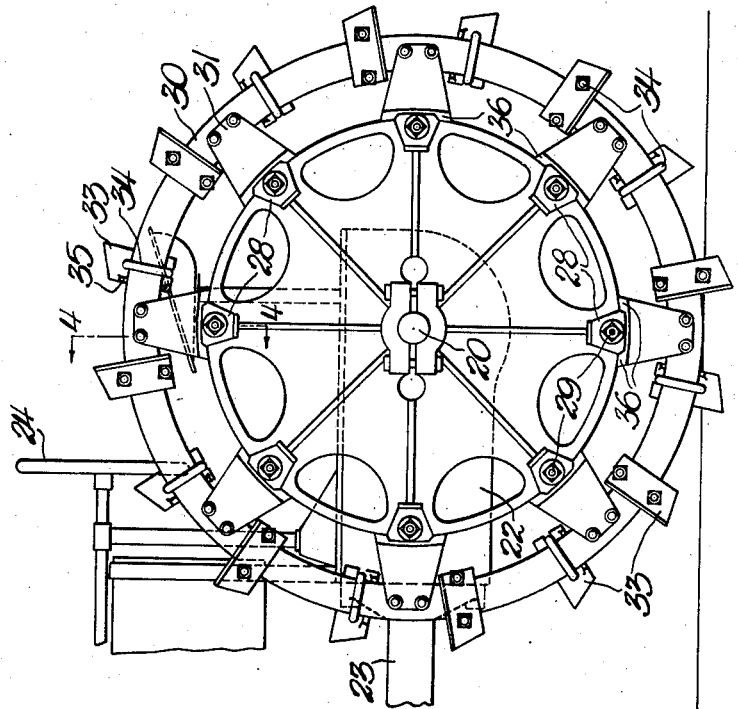
Figure 2 shows the tractor in Figure 1 with the air tires removed and having the new demountable steel traction rims.

The invention is illustrated in connection with a tractor of the general purpose type having the usual rear axle housing from which differentially driven axle shafts 20 project. The shafts 20 have traction wheels 21 adjustably secured thereto in any suitable manner. The tractor includes a forwardly extending body portion 22 having side sills 23 which is supported on dirigible steering wheels not shown.

The dirigible wheels are controlled through a steering wheel 24 located adjacent an operator's station 25.

Figure 1:
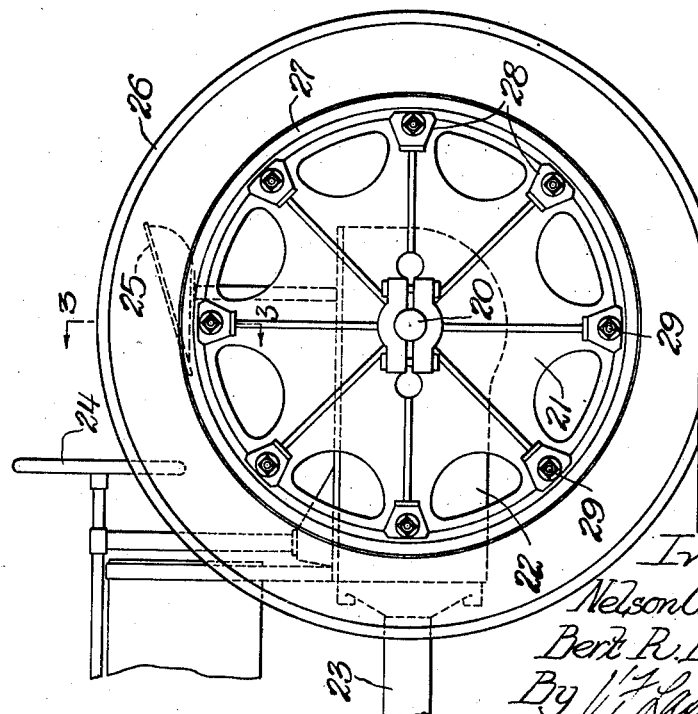
Figure 1 shows an ordinary tractor of the general purpose type having demountable air tires.

In the practice of the present invention, the usual traction wheel 21 has a demountable air tire 26 and its rim 27 demountably mounted on the wheel 21, as best shown in Figures 1 and 3, the tire and rim being mounted upon the wheel 21 by means of clamps 28 and clamp bolts and nuts 29. As the wheels on a tractor of the wide tread type are so made as to permit changing of the wheel tread by taking the wheel off and turning it about; the wheel 21 is, therefore, so made that the rim 27 may be demountable from either side, as shown in Figure 3.

Figure 2 illustrates the main object of our invention which is to provide a steel traction rim having the same driving radius as that of an air tire and at the same time to provide means whereby the steel traction tire may be interchanged for the air tire or the air tire changed for the steel tire depending upon conditions. As the price of air tires is very great, the tractors are generally shipped with the usual steel tires and lugs. Therefore, with our invention it is possible to interchange at will from steel tires to air tires or vice versa. It is also obvious that during certain periods, it is necessary to provide the air tires with increased traction means such as tire chains. However, with our invention, it is possible to substitute for the air tires the detachable steel rim and traction lugs for practically the same cost that would be necessary for traction chains or other devices for increasing the traction of air tires. In addition to this cheap demountable traction rim, greater traction can be provided than with the ordinary tire chains. In fact with the detachable traction rim the same traction can be secured as one would secure with the old style steel wheel and traction lugs.

In the demountable traction steel tire, as shown in Figure 2, this type of rim is known as a spade lug type and is in the form of a self-cleaning wheel. This type is old in the tractor art, but has been adapted into a detachable rim to be interchanged with the ordinary air tire for tractors. This demountable rim comprises a rim rolled so that the width of the stock is edgewise as shown in Figures 2 and 4. This edge rolled rim or traction lug supporting means 30 has arranged about its circumference a plurality of radially and inwardly projecting supports 31 which are equally spaced about the rim, as shown in Figure 2 and are positioned to correspond with the demountable clamps 28 which are used to secure the demountable tire in place. The radially extending support 31 is best shown in section in Figure 4. The support 31 has at its inner end a lower section 32 conforming in shape to that of the tire well of the detachable rim 27. As this well portion of the support 31 conforms to the shape of the well of the rim 27, it is obvious that this support 31 may be readily attached and detached by the usual clamp bolts 29 which secure the usual air tire rim 27 in its position on the wheel 21. The upper end of the support 31 is riveted or otherwise secured to the rim 30.

As shown in Figures 2 and 4, it is obvious that a plurality of lugs may be attached to the rim 30 in the usual manner as has always been the case with spade lug wheels of this type. Lugs 33 in this instance are the angle iron type and are clamped to the rim 30 by clamp bolts 34. To prevent the lugs from turning on the rim 30 a projection 35 engages the rim 30. The lugs 33 are alternately placed on opposite sides of the rim 30 to produce a staggered effect. In order to prevent the rim 30 from turning on the wheel 21 notches 36 are formed on the supports 31 and conform to the shape of the clamp members 28. It is, therefore, obvious that when the clamps are securely fastened to the wheel 21 and wedged against the supports 31 this demountable type of steel traction rim is prevented from turning relative with respect to the wheel 21. From this disclosure of this steel traction tire, as shown in Figures 2 and 3, it is apparent that a simple construction has been evolved wherein the steel traction tire may be readily substituted for the ordinary type of demountable air tires for tractors. With this type of steel tire there is no necessity for tire chains for the air tire 26, as this rim may be as readily mounted or demounted as the air tire and has the advantage of increased traction over that of chains on an air tire.

In the modification shown in Figures 5 and 6 the type of steel rim previously described is shown with cast spade lugs, as best shown in Figure 5 and in the cross section of Figure 6. The modification here shown has a similar rim section 30' as disclosed in Figures 2 and 4, but has secured thereto cast lugs 37 positioned at spaced intervals about the rim 30'. The lug 37 has cast integral with it a radially extending support portion 37' comparable to the support 31, previously described. The support 37' has a lower portion 37'' conforming to the well of the air tire rim 27. In order to form a complete bottom support for the rim 30' an additional cast member 38 is secured to the rim 30' and has a portion 38'' conforming to the portion 37'' of the lug 37. It is, therefore, evident that the two portions complete the tire lug and form a support from the rim where it is clamped to the wheel 21. The portions 37'' and 38'' have notched portions 39 and 40 which conform to the shape of the clamps 28 and prevent the rim from turning about the wheel. Both portions forming the lug 37 are secured to the rim 30' by the bolt 41 or in any other suitable manner. The clamp 37 and the additional support 38 have notches or lugs 42 and 43 for engaging the rim 30' to prevent the lugs from turning on the rim 30'. As shown in Figures 5 and 6, the lugs 37 are alternated on the rim 30'. With this type of rim a meadow band or overtire 44 may be used and engages notched portions 45 in the lugs 37. The lugs 37 may also be provided with any other arrangement of notches for various overtires or meadow bands which is old in the art.

With this type of spade lug rim the penetration of this type of rim is approximately equal to the driving radius of the air tire and the rim 30' has been placed approximately midway between the circumference of the wheel 21 and the driving radius of the lugs 37 so as to act as a support for the cast lugs 37. The lugs have been shown as placed in alignment with the detachable clamps 28 for securing the air tire in place. It is obvious with this arrangement of lugs that intermediate lugs similar to the lugs 37 may be attached about the rim 30' in the usual manner. Bolt holes 46 are provided for attachment of additional lugs. Also with this type of rim angle lugs such as 33 may be attached.

In the modification shown in Figure 7 the same type of rim as disclosed in Figures 2 and 4 is used, but it is shown with a special clamp bracket 47 wherein the usual air tire 26 or special steel rim construction may be detachably connected to a tractor wheel 48 so that the air tire or steel tire may be positioned in a plurality of laterally spaced intervals of known adjustment. This clamp construction 47 is not part of our invention, but is only disclosed to show the adaptability of our steel tire construction to any type of rim attachment construction. The member 47 may be positioned in four positions: the first being that shown in Figure 7; the second with the clamp 47 reversed to the position shown in Figure 7; and the third and fourth positions with a clamp 47 placed on the opposite side of the clamping portion 49, the positions being the same as for the two previously described on the side in which the clamp 47 is shown in Figure 7. The attaching section 49 is so formed as to have two wedge shaped portions 50 and 51 on opposite sides. The wedge shaped portions 50 and 51 have their surfaces parallel with respect to each other. Clamp member 47 also has a section 52 similar to the section 49, but with the portions reversed with respect to each other. The section 52 has wedge portions 53 and 54 on opposite sides comparable to the wedge portions 50 and 51 of the member 49. It is evident, then, that, as the clamp bolt 55 is drawn into its securing position the clamp member 47 tends to rise or move outwardly with respect to the wheel 48, thus clamping the steel tire rim to the wheel 48. Rotation of the steel tire rim 30 is prevented by having portions 55' engaging with the notches 36 of the supporting member 31. The clamp member 47 is also shaped as at 56 to be complementary to the well shaped portion 32 of the member 31. As the well shaped portion 56 conforms to the well of an air tire rim 27, it is also evident that this clamp member 47 may be used to clamp a tractor air tire 26 to the tractor wheel 48 in the same manner as the steel tire rim 30 is attached. With this construction, it is possible to interchange a steel traction tire for a tractor air tire or vice versa, and also to position the steel tire or air tire in a plurality of laterally spaced positions.

In the modifications shown in Figures 8 and 9, a wide steel rim 57, as ordinarily used with traction wheel is formed into a demountable steel tire. The rim and wheel construction is similar to that previously disclosed in Figures 1 and 2 where there is the usual tractor wheel 21 having clamp bolts 28 for detachably mounting the usual tractor air tire. In the modification here shown the flat rim 57 is of the same diameter as the usual tractor wheel of this type and has detachable supporting members 58 circumferentially spaced and inwardly extending from the rim 57. The supporting members 58 are so spaced as to conform with the clamp members 28 of the wheel 21. The lower portion of the supporting member 58 has a section 59 conforming to the well of the air tire rim 27 and is similar also to the section described in the modifications as shown in Figures 4 and 6. Notches 60 are provided to be engaged by the clamp members 28 to prevent the rim from turning with respect to the wheel 21. Lugs 61 of a standard type may be bolted or otherwise secured to the rim 57 and this rim 57 is usually provided with a series of holes for the attachment of various other types of lugs or extension rims.

In the modification shown in Figures 10 and 11 there is shown the rear end of a truck of the six or eight wheel type and which may have either one or both of the axles used for driving the truck. These figures may represent the front of a truck in which the wheels are steerable or driven. In certain weather conditions where the roads are covered with snow and ice or mud or in rough terrain over which trucks pass, as in military operations it is necessary at times to secure additional traction. As shown in Figure 10, a demountable steel tire has been evolved to replace the usual air tire of a truck. This demountable steel tire 62 is similar to that previously disclosed for the tractor tire, as shown in Figures 2 and 4. A support 63, however, for the rim 62 has been modified, as shown in Figure 11, to be used with the usual type of spoke end mounting for dual tires. The support 63 at its lower end is modified, as at 64, to conform to the shape of the air tire rim 65 and its detachable rim member 66. The steel tire 62 and the air tire 67 is clamped to the spoke end 68 of an artillery type of wheel 69, as best shown in section in Figure 11. The type of mounting shown in Figure 11 is of a standard well-known type and is not the subject of the invention except as it shows the method of mounting our special tire to a spoke end mounting for wheel tires. Both the air tire and the steel tire are held in its clamped position by the wedge member 70 engaging the member 63 and the rim 65. As the clamp bolt 71 is tightened the clamp 72 engages the support 63 which transmits the wedging action to the member 70 in order to secure the air tire 67 in place. A notched portion 73 is engaged by the clamp 72 to prevent the steel tire from turning with respect to the wheel 69. Traction lugs 74 are secured in the usual manner to the rim 62 by clamp bolts 75. It is obvious that any other type of driving lugs may be secured to the rim 62. It is also obvious that dual steel tires may be attached as readily as the attachment of one air tire and an additional steel tire, as has just been described. It is also evident that with the lugs 74 removed, as the rim 62 is of substantially the same radius as the driving radius of the air tire 67, the steel rim 62 may be used as a safety rim for the front wheels of a truck in case of a puncture to one of the air tires, such as 67.

In the modifications shown in Figures 12, 13, 14, 15, 16, and 17 means of attaching extension rims to steel traction tires are disclosed, as has been previously disclosed in the modification of Figure 4. In certain types of traction wheels extension rims may be attached to the lugs, but as it is often necessary to travel on paved roads where laws prohibit the use of lugs, it is evident that there is need of means for attaching extension rims to a wheel of the spade wheel type without the use of traction lugs. In the modification shown in Figure 12, there is disclosed a section of a steel rim similar to that disclosed in Figure 4. In this instance a support 75 is clamped in the usual manner to the wheel 21 by the usual clamps 28 and clamp bolt 29. The support 75 has also secured to it in the usual manner the steel rim 76. For attaching extension rims 77 to either one side of the steel rim 76 or, as disclosed in Figure 12 where two extension rims are shown attached to the steel tire, the extension rims 77 have supports 78 riveted or otherwise secured thereto and mounted on the support 75. The designs of the support 75 and the member 78 are such as to be symmetrical about the axle of the wheel so that the extension rim 77 may be interchangeable on each side of the steel tire 76. The supports 78 are secured to the members 75 by the clamping bolts 79. The extension rims are prevented from turning relative to the supports 75 by lugs 80 cast integral with the support 75. With this modification, as shown in Figure 12, it is evident that the extension rims may be as readily attached to and detached from the steel tire 76 as the steel tire itself is attached to or detached from the steel tire 21. The extension rims 77 may be split or made in one complete piece—whichever is best suited for the construction. It is evident, therefore, that a smooth surface is presented when the tractor is used for traveling on the highways and that lugs may be readily attached when it is necessary to use the tractor in the field either to the steel rim 76, as has been previously disclosed or connected to the extension rims themselves.

In the modification shown in Figures 13, 16, and 17, there is disclosed a means for mounting the extension rims which is a modification of that shown in Figure 12. In Figure 13 the steel tire 76 has mounted thereon spade lugs 81, as best shown in Figures 13, 16, and 17 clamped to the steel tires 76 by U-bolts 81'. The lugs are prevented from turning by the horizontal portion of the U-bolt passing through a notch 76' in the steel tire 76. The lugs 81 are staggered, as shown in Figure 13, and are provided with attaching means for attaching extension rims 82, similar to the extension rims 77. For quickly attaching the rims 82 to the lugs 81 about the periphery the lugs 81 are provided with swinging bolts 83 pivotally attached to the lugs 81 by the stud or pin 84. The lug 81 is provided with a slot 85 for the bolt 83 to swing through. A notch 86 in the extension rim is provided in alignment with the notch 85 to permit the bolt 83 to swing through prior to the nut being drawn against the extension rim to be secured to the lug 81. The modifications in Figures 13 and 14 show a simple structure for attaching a spade lug to the steel rim. However, it is evident that other suitable structure may be used.

It is evident that there has been disclosed a simple structure wherein a detachable steel rim similar to the usual type of steel tractor wheels has been adapted to replace a quick detachable air tire for tractor wheels. The structure has been so designed that the air tires and the detachable steel traction rims are interchangeable one with respect to the other and that if a tractor is first supplied with air tires that the steel traction rims may be interchangeable wherever necessity requires this type of traction tire or if the tractor is shipped with the demountable steel traction rim that wherever the necessity such as transporting the tractor on the highway, the usual demountable air rim may be used. It is also obvious that the steel rims, such as disclosed in Figure 4 may be used without the traction lugs 33 for transport purposes or that the air tire may be substituted for the whole steel rim construction. Other modifications have also been disclosed showing the method of attaching certain types of rim construction to the same supporting members whereby the completed steel traction rim may be readily attached to the usual tractor demountable wheel. There has been disclosed also structures wherein the usual dual type of truck wheels may be provided with the steel rims in place of the usual air tire or provision made for making a safety wheel from the steel rim. There has also been disclosed various examples of certain structures for attaching extension rims to the steel traction tire where increased bearing surface is required in certain field conditions.

The preferred embodiment of the invention herein described is also capable of certain other modifications without departure from the scope of the invention to be defined in the following claims.

What is claimed is:

1. In a wheel structure capable of supporting and holding a demountable air tire and rim by means of a plurality of peripherally spaced clamping means, the combination with said clamping means of a traction device interchangeable with the tire and rim, said device comprising a plurality of separate peripherally spaced supports extending outwardly from the wheel and clamped individually thereto by the aforesaid clamping means, a ring having its radial thickness considerably greater than its axial thickness held radially outwardly of the wheel at the outer ends of the supports and serving to maintain the peripheral spacing of the supports, and a plurality of traction lugs mounted on the ring.

2. In a wheel structure as specified in claim 1, each support specified being relatively thick at the end which the clamping means engage and relatively thin at the other end where the ring is held.

3. In a wheel structure as specified in claim 1, alternate traction lugs being positioned toward opposite sides of the ring and extending laterally beyond the supports, and a pair of rims carried by the lugs at their under sides thereof at opposite sides of the supports and being of substantially the same outer diameter as the ring.

4. In a wheel structure capable of holding a demountable air tire and rim by means of a plurality of peripherally spaced clamping means, the combination with said clamping means of a traction device interchangeable with the tire and rim, said traction device comprising a plurality of separate peripherally spaced supports extending outwardly from the wheel and clamped individually thereto by the aforesaid clamping means, and a ring having its axial thickness considerably greater than its radial thickness supported radially outwardly of the wheel on the outer ends of the supports and serving to maintain the peripheral spacing of the supports, and a plurality of traction lugs mounted on the ring.

NELSON C. CUDDEBACK.
BERT R. BENJAMIN.